(12) United States Patent  (10) Patent No.: US 8,341,602 B2
Hawblitzel et al.  (45) Date of Patent: Dec. 25, 2012

(54) AUTOMATED VERIFICATION OF A TYPE-SAFE OPERATING SYSTEM

(75) Inventors: Chris Hawblitzel, Redmond, WA (US); Jean Yang, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 442 days.

(21) Appl. No.: 12/714,468

(22) Filed: Feb. 27, 2010

(65) Prior Publication Data

US 2010/0192130 A1 Jul. 29, 2010

Related U.S. Application Data

(63) Continuation-in-part of application No. 12/362,444, filed on Jan. 29, 2009.

(51) Int. Cl.
  G06F 9/44 (2006.01)
  G06F 9/45 (2006.01)
  H04L 29/06 (2006.01)
(52) U.S. Cl. ........ 717/126; 717/136; 717/140; 717/168; 713/164
(58) Field of Classification Search .................. None
  See application file for complete search history.

(56) References Cited

U.S. PATENT DOCUMENTS

| | | | |
|---|---|---|---|
| 5,485,613 A | 1/1996 | Engelstad | |
| 6,128,774 A | 10/2000 | Necula | |
| 6,219,787 B1 * | 4/2001 | Brewer | 713/167 |
| 6,925,637 B2 | 8/2005 | Thomas | |
| 7,139,784 B2 | 11/2006 | Knobe | |
| 7,233,733 B2 | 6/2007 | Derby | |
| 7,392,527 B2 * | 6/2008 | Callender | 719/327 |
| 7,509,639 B2 * | 3/2009 | Worley, Jr. | 718/1 |
| 7,818,729 B1 * | 10/2010 | Plum et al. | 717/140 |
| 8,104,021 B2 * | 1/2012 | Erlingsson et al. | 717/126 |
| 8,127,280 B2 * | 2/2012 | Thomas et al. | 717/136 |
| 8,132,002 B2 * | 3/2012 | Lo et al. | 713/164 |
| 8,181,021 B2 * | 5/2012 | Ginter et al. | 713/164 |
| 2004/0172638 A1 | 9/2004 | Larus | |
| 2005/0065973 A1 | 3/2005 | Steensgaard et al. | |
| 2005/0071387 A1 | 3/2005 | Mitchell | |

(Continued)

OTHER PUBLICATIONS

Klein et al., seL4: formal verification of an OS kernel, Oct. 2009, 14 pages, <http://delivery.acm.org/10.1145/1630000/1629596/p207-klein.pdf>.*

(Continued)

*Primary Examiner* — Thuy Dao
(74) *Attorney, Agent, or Firm* — Lyon & Harr, LLP; Mark A. Watson (57) ABSTRACT

An "Automated, Static Safety Verifier" uses typed assembly language (TAL) and Hoare logic to achieve highly automated, static verification of type and memory safety of an operating system (OS). Various techniques and tools mechanically verify the safety of every assembly language instruction in the OS, run-time system, drivers, and applications, except the boot loader (which can be separately verified). The OS includes a "Nucleus" for accessing hardware and memory, a kernel that builds services running on the Nucleus, and applications that run on top of the kernel. The Nucleus, written in verified assembly language, implements allocation, garbage collection, multiple stacks, interrupt handling, and device access. The kernel, written in C# and compiled to TAL, builds higher-level services, such as preemptive threads, on top of the Nucleus. A Hoare-style verifier with automated theorem prover verifies safety and correctness of the Nucleus. A TAL checker verifies safety of the kernel and applications.

20 Claims, 5 Drawing Sheets

"SafeOS" STRUCTURE SHOWING EXEMPLARY FUNCTIONS EXPORTED BY NUCLEUS

U.S. PATENT DOCUMENTS

| | | | |
|---|---|---|---|
| 2005/0114842 A1* | 5/2005 | Fleehart et al. | 717/126 |
| 2006/0085433 A1 | 4/2006 | Bacon | |
| 2006/0265438 A1 | 11/2006 | Shankar | |
| 2006/0277539 A1* | 12/2006 | Amarasinghe et al. | 717/168 |
| 2007/0174370 A1 | 7/2007 | Detlefs | |
| 2007/0285271 A1 | 12/2007 | Erlingsson | |
| 2008/0010327 A1 | 1/2008 | Steensgaard | |
| 2008/0148244 A1* | 6/2008 | Tannenbaum et al. | 717/136 |
| 2012/0084759 A1* | 4/2012 | Candea et al. | 717/126 |

OTHER PUBLICATIONS

Heiser et al., Towards trustworthy computing systems: taking microkernels to the next level, Jul. 2007, 9 pages, <http://delivery.acm.org/10.1145/1280000/1278904/p3-heiser.pdf>.*

Yang et al., Safe to the last instruction: automated verification of a type-safe operating system, Dec. 2011, 9 pages, <http://delivery.acm.org/10.1145/2050000/2043197/p123-yang.pdf>.*

Barnett, M., B.-Y. E. Chang, R. DeLine, B. Jacobs, K. Rustan, M. Leino, Boogie: A modular reusable verifier for object-oriented programs, 4th Int'l Symposium on Formal Methods for Components and Objects, FMCO 2005, Nov. 1-4, 2005, pp. 364-387, Springer, Amsterdam, The Netherlands.

Baumann, A., P. Barham, P.-É. Dagand, T. L. Harris, R. Isaacs, S. Peter, T. Roscoe, A. Schüpbach, A. Singhania, The Multikernel: A new OS architecture for scalable multicore systems, Proc. of the 22nd ACM Symposium on Operating Sys's Principles, SOSP 2009, Oct. 11-14, 2009, pp. 29-44, Big Sky, Montana, USA.

Bevier, W. R., W. A. Hunt Jr., J. S. Moore, W. D. Young, An approach to systems verification, Technical Report 41, Computational Logic, Inc., Apr. 1989, 19 page.

Bevier, W. R., Kit: A study in operating system verification, Technical Report 28, Computational Logic, Inc., Aug. 1988, 28 pages.

Chen, J., C. Hawblitzel, F. Perry, M. Emmi, J. Condit, D. Coetzee, P. Pratikaki, Type-preserving compilation for large-scale optimizing object-oriented compilers, Proc. of the ACM SIGPLAN 2008 Conf. on Programming Language Design and Implementation., PLDI 2008, Jun. 7-13, 2008, pp. 183-192, Tucson, AZ, USA.

Edelman, J. R., Machine code verification using the bogor framework, Master of Science thesis, Brigham Young University, Aug. 2008, 39 pages.

Fähndrich, M., M. Aiken, C. Hawblitzel, O. Hodson, G. C. Hunt, J. R. Larus, S. Levi, Language support for fast and reliable message-based communication in singularity OS, Proc. of the 2006 EuroSys Conf., Apr. 18-21, 2006, pp. 177-190, Leuven, Belgium.

Feng, X., Z. Shao, Y. Guo, Y. Dong, Certifying low-level programs with hardware interrupts and preemptive threads, J. Autom. Reasoning, Apr. 2009, vol. 42, No. 2-4, pp. 301-347.

Feng, X., Z. Shao, Y. Dong, Y. Guo, Certifying low-level programs with hardware interrupts and preemptive threads, Proc. of the ACM SIGPLAN 2008 Conf. on Programming Language Design and Implementation, PLDI 2008, Jun. 7-13, 2008, pp. 170-182, Tucson, AZ, USA.

Feng, X., Z. Shao, Modular verification of concurrent assembly code with dynamic thread creation and termination, Proc. of the 10th ACM SIGPLAN Int'l Conf. on Functional Programming, ICFP 2005, Sep. 26-28, 2005, pp. 254-267, Tallinn, Estonia.

Ford, B., M. Hibler, J. Lepreau, R. McGrath, P. Tullmann, Interface and execution models in the fluke kernel, Proc. of the Third USENIX Symposium on Operating Sys's Design and Implementation, OSDI 1999, Feb. 22-25, 1999, pp. 101-115, New Orleans, Louisiana, USA.

Grossman, D., J. G. Morrisett, Scalable certification for typed assembly language, Third International Workshop on Types in Compilation, TIC 2000, Revised Selected Papers, Sep. 21, 2000, pp. 117-146, vol. 2071, Springer, Montreal, Canada.

Hallgren, T., M. P. Jones, R. Leslie, A. P. Tolmach, A principled approach to operating system construction in Haskell, Proc. of the 10th ACM SIGPLAN Int'l Conf. on Functional Programming, ICFP 2005, pp. 116-128, Sep. 26-28, 2005, Tallinn, Estonia.

Klein, G., K. Elphinstone, G. Heiser, J. Andronick, D. Cock, P. Derrin, D. Elkaduwe, K. Engelhardt, R. Kolanski, M. Norrish, T. Sewell, H. Tuch, S. Winwood, seL4: Formal verification of an OS kernel, Proc. of the 22nd ACM Symposium on Operating Systems Principles 2009, SOSP 2009, Oct. 11-14, 2009, pp. 207-220, Big Sky, Montana, USA.

Lin, C., A. McCreight, Z. Shao, Y. Chen, Y. Guo, Foundational typed assembly language with certified collecton, First Joint IEEE/IFIP Symposium on Theoretical Aspects of Software Eng'g, TASE 2007, Jun. 5-8, 2007, pp. 326-338, Shanghai, China.

Maeda, T., Safe execution of user programs in Kernel mode using typed assembly language, Master Thesis, Feb. 5, 2002, pp. 1-36, The University of Tokyo, Tokyo, Japan.

Makholm, H., A region-based memory manager for prolog, Proc. of the 2nd Int'l Symposium on Memory Management, ISMM 2000, Jan. 2001, pp. 25-34, vol. 36, No. 1, ACM New York, NY, USA.

Maus, S., M. Moskal, W. Schulte, Vx86: x86 Assembler simulated in C powered by automated theorem proving, Proc. of teh 12th Int'l Conf. on Algebraic Methodology and Software Tech., AMAST 2008, Jul. 28-31, 2008, pp. 284-298, Springer, Urbana, IL, USA.

McCreight, A., Z. Shao, C. Lin, L. Li, A general framework for certifying garbage collectors and their mutators, Proc. of the ACM SIGPLAN 2007 Conf. on Programming Language Design and Implementation, PLDI 2007, Jun. 11-13, 2007, pp. 468-479, San Diego, California, USA.

Miller, J. S., G. J. Rozas, Garbage collection is fast, but a stack is faster, AI Memo No. 1462, Massachusetts Institute of Technology Artificial Intelligence Laboratory, Mar. 1994, pp. 1-36, Cambridge, MA, USA.

Morrisett, J. G., D. Walker, K. Crary, N. Glew, From system F to typed assembly language, ACM Trans. Program. Lang. Syst., May 1999, pp. 527-568, vol. 21, No. 3.

de Moura, L. M., N. Bjørner, Z3: An efficient SMT solver, Proc. of the 14th Int'l Conf. on Tools and Algorithms for the Construction and Analysis of Sys's, TACAS 2008, Held as Part of the Joint European Conf. on Theory and Practice of Software, ETAPS 2008, Mar. 29-Apr. 6, 2008, pp. 337-340, Budapest, Hungary.

Ni, Z., D. Yu, Z. Shao, Using XCAP to certify realistic systems code: Machine context management, Proc. 20th Int'l Conf. Theorem Proving in Higher Order Logics, TPHOLs 2007, Sep. 10-13, 2007, pp. 189-206, vol. 4732, Springer, Kaiserslautern, Germany.

Petersen, L., R. Harper, K. Crary, F. Pfenning, A type theory for memory allocation and data layout, The 30th SIGPLAN-SIGACT Symposium on Principles of Programming Languages, Jan. 15-17, 2003, pp. 172-184, New Orleans, Louisiana, USA.

Tillman, N., Pex now a DevLabs project, Nikolai Tillman's Blog, retrieved from http://blogs.msdn.com/nikolait, May 21, 2008, pp. 1-14.

Vechev, M. T., E. Yahav, D. F. Bacon, N. Rinetzky, CGCExplorer: A semi-automated search procedure for provably correct concurrent collectors, Proc. pf the ACM SIGPLAN 2007 Conf. on Programming Language Design and Implementation, PLDI 2007, Jun. 11-13, 2007, pp. 456-467, San Diego, California, USA.

Wang, D. C., A. W. Appel, Type-preserving garbage collectors, The 28th ACM SIGPLAN-SIGACT Symposium on Principles of Programming Languages, POPL 2001, Jan. 17-19, 2001, pp. 166-178, London, UK.

Xi, H., R. Harper, A dependently typed assembly language, Proc. of the Sixth ACM SIGPLAN Int'l Conf. on Functional Programming, ICFP 2001, Sep. 3-5, 2001, pp. 169-180, Firenze (Florence), Italy.

Dao, T., Office Action, U.S. Appl. No. 12/362,444, May 11, 2012, pp. 1-10.

* cited by examiner

AUTOMATED VERIFICATION OF A TYPE-SAFE OPERATING SYSTEM

CROSS-REFERENCE TO RELATED APPLICATIONS

This application is a Continuation-in-Part (CIP) of, and claims the benefit under Title 35, U.S. Code, Section 120 of, previously filed U.S. patent application Ser. No. 12/362,444, filed on Jan. 29, 2009, by Chris Hawblitzel, and entitled "Automatic Region-Based Verification of Garbage Collectors", the subject matter of which is incorporated herein by this reference.

BACKGROUND

1. Technical Field

An "Automated, Static Safety Verifier", as described herein, uses typed assembly language (TAL) and Hoare logic to achieve highly automated, static verification of both type and memory safety for constructing a "safe" operating system.

2. Related Art

Low-level software, such as operating systems and language run-time systems, should be reliable and secure. Without reliability, users endure frustration and potential data loss when the system software crashes. Without security, users are vulnerable to attacks from the network, which often exploit low-level bugs such as buffer overflows to take over a user's computer. Unfortunately, today's low-level software still suffers from a steady stream of bugs, often leaving computers vulnerable to attack until the bugs are patched.

Many projects have proposed using safe languages to increase the reliability and security of low-level systems. Safe languages ensure type safety and memory safety: accesses to data are guaranteed well-typed and guaranteed not to overflow memory boundaries or dereference dangling pointers. This safety rules out many common bugs, such as buffer overflow vulnerabilities. Unfortunately, even if a language is safe, implementations of the language's run-time system might have bugs that undermine the safety. For example, such bugs have left many conventional web browsers open to attack.

The desire to formally verify low-level operating systems (OS) and run-time system code is not new. Nevertheless, very little mechanically verified low-level OS and run-time system code exists, and, as is known to those skilled in the art, that code still requires many person-years of effort to verify.

For example, with respect to OS and run-time system verification efforts, more than 20 years ago, the well-known Boyer-Moore mechanical theorem prover verified a small OS and a small high-level language implementation. These were not integrated into a single system, though, and each piece in isolation was quite limited. The OS, referred to as "Kit", was quite small, containing just a few hundred assembly language instructions. It supported a fixed number of preemptive threads, but did not implement dynamic memory allocation or thread allocation. Further, it ran on an artificial machine rather than on standard hardware. The language used, "micro-Gypsy", was small enough that it did not require a significant run-time system, as it had no heap allocation or threads.

More recently, the well-known "seL4" project verified all of the C code for an entire microkernel. seL4 works on uniprocessors, providing preemption via interrupts, and providing non-blocking system calls. seL4 also provides memory protection by providing address spaces of pages protected by hardware page tables. Unfortunately, seL4 does not provide objects that are protected by type safety. Further, seL4 processes communicate through shared memory or message passing. Therefore, unfortunately, seL4 does not have a communication mechanism that is statically checked for safety. In addition, seL4 verifies its C code; however, its assembly language (~600 lines of ARM assembler) is currently unverified. The seL4 microkernel contained ~8700 lines of C code, substantially larger than earlier verified operating systems like Kit. On the other hand, the effort required was also large. In fact, it was reported that the seL4 project required 20 person-years of research devoted to developing their proofs, including 11 person-years specifically for the seL4 code base. The proof required 200,000 lines of Isabelle scripts—a 20-to-1 script-to-code ratio. Thus, while seL4 demonstrates that microkernels are within the reach of interactive theorem proving, the seL4 project fails to provide an acceptably efficient solution to the problem of realistic systems software verification.

The well-known "FLINT" project sets an ambitious goal to build foundational certified machine code, where certification produces a proof about an executable program, and a very small proof checker can verify the proof. The FLINT project uses powerful higher-order logic to verify properties of low-level code, but fails to achieve significant automation. For example, the preemptive thread library of the FLINT project requires ~35,000 lines of script for about 300 lines of assembly language (plus many tens of thousands of lines of script to build up foundational lemmas about the program logic). Separately, the FLINT project also created a certified system combining TAL with certified garbage collection (GC). Unfortunately, the TAL/GC system was rather limited in that it supported only objects containing exactly two words. Further, it performed only conservative collection, and did not support multiple threads.

Finally, as is well-known to those skilled in the art, H monads have been used to export a set of operating system primitives usable to develop an operating system in a high-level language. For example, H was used to build the well-known "House" operating system. However, H itself is not formally verified, and relies on a large Haskell run-time system for correctness.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In general, an "Automated, Static Safety Verifier," as described herein, uses typed assembly language (TAL) and Hoare logic to achieve highly automated, static verification of both type and memory safety of an operating system. An example of a safe operating system constructed using the techniques described herein is referred to herein as "SafeOS". The "Automated, Static Safety Verifier" uses various techniques and tools to mechanically verify the safety of every assembly language instruction in the operating system, run-time system, drivers, and applications, with the exception of an operating system boot loader.

SafeOS, or a similar operating system constructed using the "Automated, Static Safety Verifier", includes a "Nucleus" that provides access to hardware and memory, a "kernel" that builds services on top of the Nucleus, and applications that run on top of the kernel. The Nucleus, written in verified assembly language, implements allocation, garbage collection, multiple stacks, interrupt handling, and device access. The kernel, written in C# (or other language) and compiled to TAL, builds higher-level services, such as preemptive threads, on top of the Nucleus. A TAL checker then verifies the safety of the kernel and applications. Finally, a Hoare-style verifier with an automated theorem prover verifies both the safety and correctness of the Nucleus.

As noted above, SafeOS is a simple example of a safe operating system constructed using the techniques described herein. It should be understood that the discussion of SafeOS is provided only for purposes of explanation with respect to the construction of a safe OS using the "Automated, Static Safety Verifier". As such, it should be understood that while feature rich safe operating systems can be constructed using the "Automated, Static Safety Verifier", in its current implementation, SafeOS is a small safe operating system that has a number of programmatic limitations. For example, it lacks support for many common C# features: exception handling, for example, is implemented by killing a thread entirely, rather than with try/catch. It lacks the standard .NET class library, since the library's implementation currently contains much unsafe code. It lacks dynamic loading of code. Although it protects applications from each other using type safety, it lacks a more comprehensive isolation mechanism between applications, such as Java Isolates, C# AppDomains, or Singularity SIPs. The verification does not guarantee termination. Finally, SafeOS uses verified garbage collectors (as described in the aforementioned copending U.S. patent application) that are stop-the-world rather than incremental or real-time, and SafeOS keeps interrupts disabled throughout the collection.

However, it should be understood that none of the limitations in SafeOS's present implementation, as described above are fundamental. In fact, it must be understood that the implementation of SafeOS, as described herein, is simply a basic example of the more general capabilities of the "Automated, Static Safety Verifier" for constructing verifiably safe operating systems. Specifically, the high degree of automation in SafeOS's verification, provided by the "Automated, Static Safety Verifier", will allow SafeOS, or any other OS constructed using the "Automated, Static Safety Verifier" to scale to a more realistic feature set, such as a large library of safe code and a verified incremental garbage collector.

In view of the above summary, it is clear that the "Automated, Static Safety Verifier" described herein provides various unique techniques for achieving highly automated, static verification of both type and memory safety for constructing a "safe" operating system. In addition to the just described benefits, other advantages of the "Automated, Static Safety Verifier" will become apparent from the detailed description that follows hereinafter when taken in conjunction with the accompanying drawing figures.

DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction:

In general, an "Automated, Static Safety Verifier," as described herein, uses typed assembly language (TAL) and Hoare logic to achieve highly automated, static verification of both type and memory safety of an operating system. The "Automated, Static Safety Verifier" uses various techniques and tools to mechanically verify the safety of every assembly language instruction in the operating system, run-time system, drivers, and applications, with the exception of an operating system boot loader. An example of a safe operating constructed using the techniques described herein is referred to herein as "SafeOS". However, it should be understood that SafeOS is a simple example of a safe operating system constructed using the techniques described herein, that is described only for purposes of explanation. As such, it should be understood that safe OS's with expanded feature sets can be constructed using those same techniques. Consequently, any limitations in the feature set of the exemplary SafeOS should not be interpreted as limiting the capabilities of the "Automated, Static Safety Verifier" to create a safe OS having any desired features or capabilities.

More specifically, the "Automated, Static Safety Verifier" is used to generate an operating system, such as the SafeOS example discussed herein, and run-time system that is verified to ensure both type and memory safety. Such safety is ensured by mandating that every assembly language instruction in the running system is mechanically verified for safety. This includes every instruction of every piece of software except the boot loader. In other words, all applications, device drivers, thread schedulers, interrupt handlers, allocators, garbage collectors, etc., are verified safe. The "Automated, Static Safety Verifier" leverages two technologies to verify OS safety: TAL (typed assembly language) and automated SMT (satisfiability modulo theories) theorem provers. As described in further detail below, these technologies are adapted to automate most of the verification.

A safe operating system such as SafeOS consists of at least three layers, including: a "Nucleus" that provides primitive access to hardware and memory, a "kernel" that builds system services on top of the Nucleus, and applications that run on top of the kernel. In a tested embodiment of the "Automated, Static Safety Verifier", the kernel and applications were written in safe C# (though it should be clear that other languages may also be used, if desired), which is automatically compiled to TAL. An existing TAL checker was then used to verify this TAL (again, automatically). The Nucleus was written directly in assembly language, and was annotated with specifications (including preconditions, postconditions, and loop invariants). Note that these "specifications" are also referred to herein as "allowed behaviors" or simply as "annotations".

A Hoare-style program verifier called "Boogie" was then used verify the assembly language against a specification (i.e., allowed behaviors) of safety and correctness. This ensures the safety and correctness of the Nucleus's implementation, including safe interaction with the TAL code and safe interaction with hardware (including memory, interrupts, timer, keyboard, and screen). Boogie relies on Z3, an automated SMT theorem prover, to check that the specifications (i.e., the allowed behaviors) are satisfied. Writing the specifications requires human effort, but once they are written, Boogie and Z3 verify them completely automatically. As a result, the Nucleus of a safe operating system, such as the "SafeOS" Nucleus, requires only 2-3 lines of proof annotation per executable statement, which, as is known to those skilled in the art, is an order of magnitude less than similar projects based on interactive theorem provers.

Note that some of the stack-based concepts described herein build on techniques described in the aforementioned co-pending U.S. patent application Ser. No. 12/362,444, entitled "Automatic Region-Based Verification of Garbage Collectors", that guarantee the safety of higher-level language code, such as C#. In particular, as described in further detail below, the stack-based solutions described herein enforce the guarantee that whenever the assembly-language code transfers control to higher-level code, the higher-level code's stack and heap are "well-formed" (see Section 1.1 for a definition of "well-formed" and other terms used throughout this document). This solution, however, extends the stack-based solutions of the aforementioned co-pending U.S. patent application (which allowed only one stack) to handle multiple stacks. Because the assembly language code is free to modify the stack pointer, as described in further detail below, it can easily switch to any higher-level language stack. This enables the assembly language code to implement multiple threads. Although the assembly language code runs with interrupts disabled, the higher-level language code may run with interrupts enabled, so that the higher-level language code may be preempted by an interrupt. This allows the assembly language code to implement preemptive threads.

In addition, various techniques described in the aforementioned co-pending U.S. patent application express memory management (including garbage collection) as assembly language code, verifiable by Boogie/Z3. These techniques use regions to ensure that the garbage collector scans the higher-level language stack before completing a garbage collection: the stack and the heap are associated with "regions", and the stack's region must match the heap's region at the end of garbage collection. These concepts from the aforementioned co-pending U.S. patent application are extended to multiple stacks, as described herein, where all the stacks' regions must match the heap's region at the end of garbage collection. This ensures that the verified assembly language code correctly finds and scans all stacks for threads that may run in the future.

1.1 General Definitions and Considerations:

The "Automated, Static Safety Verifier", as described herein will be discussed using various terms and definitions, several of which are specifically defined below for purposes of explanation and understanding.

Memory Safe Program: A program is said to be "memory safe" if the program can never access memory that is not currently allocated for use by the program.

Type Safe Program: A program is said to be "type safe" if types are associated with pointers to memory, and the program can only access memory subject to rules associated with these types Safe Operating System: An operating system is said to be "safe" if the operating system is both "memory safe" and "type safe".

Verifiably Safe Operating System: An operating system is said to be "verifiably safe" if a computer verification program can analyze the source code of the operating system to verify that the operating system is "safe" (see above definition of a "safe" operating system).

Well-Formed Stack: A stack is said to be "well-formed" if it consists of zero or more stack frames, where both of the following conditions hold:
1. Each frame's memory does not overlap with the memory of any other stack frame or object; and
2. Each frame contains zero or more pointers, each pointing to some object, where:
    a. If the pointer has type t, then the pointed-to object has a type that is assignable to t.

Well-Formed Object: An object is said to be "well-formed" if both of the following conditions hold:
1. The object's memory does not overlap with the memory of any other stack frame or object; and
2. The object contains zero or more pointers, each pointing to some object, where:
    a. If the pointer has type t, then the pointed-to object has a type that is assignable to t.

Figure 1:
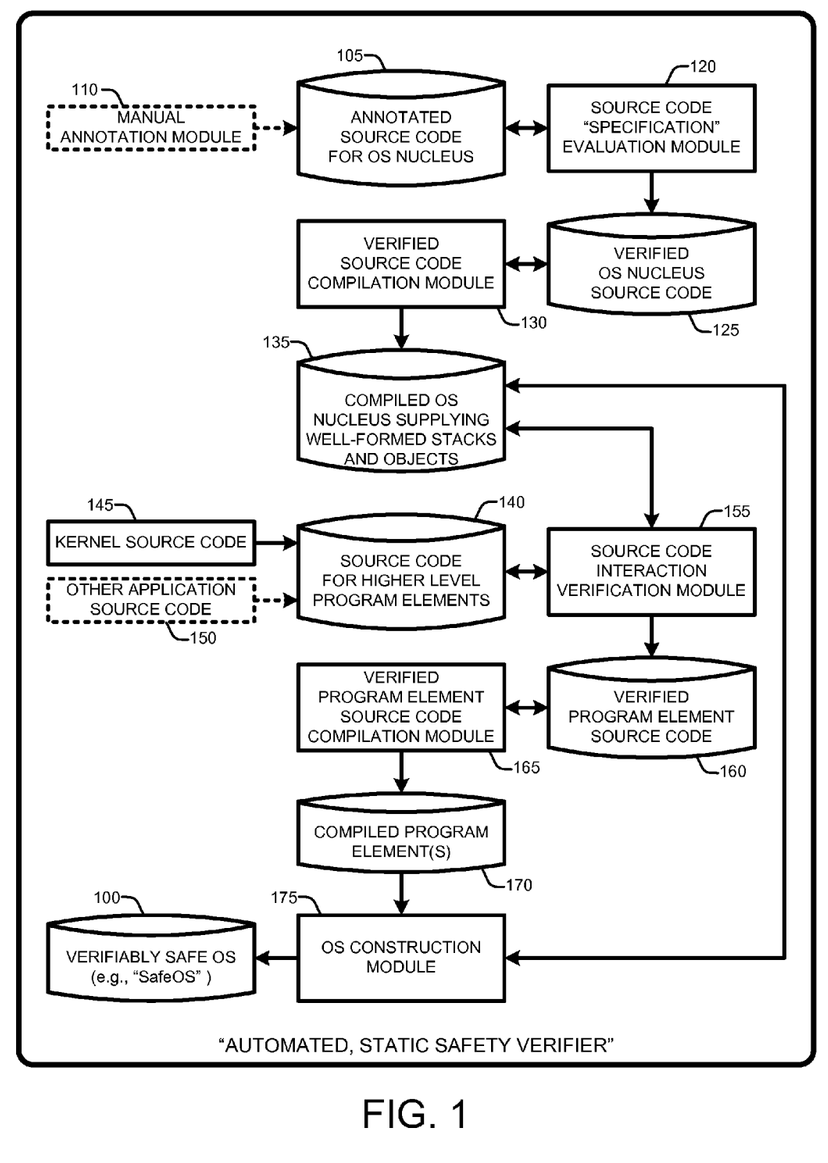
FIG. 1 provides an exemplary architectural flow diagram that illustrates program modules for implementing various embodiments of an "Automated, Static Safety Verifier", as described herein.

1.2 System Overview:

As noted above, the "Automated, Static Safety Verifier," provides various techniques for using typed assembly language (TAL) and Hoare logic to achieve highly automated, static verification of both type and memory safety of an operating system. The processes summarized above are illustrated by the general system diagram of FIG. 1. In particular, the system diagram of FIG. 1 illustrates the interrelationships between program modules for implementing various embodiments of the "Automated, Static Safety Verifier", as described herein. Furthermore, while the system diagram of FIG. 1 illustrates a high-level view of various embodiments of the "Automated, Static Safety Verifier", FIG. 1 is not intended to provide an exhaustive or complete illustration of every possible embodiment of the "Automated, Static Safety Verifier" as described throughout this document.

In addition, it should be noted that any boxes and interconnections between boxes that may be represented by broken or dashed lines in FIG. 1 represent alternate embodiments of the "Automated, Static Safety Verifier" described herein. Furthermore, any or all of these alternate embodiments, as described below, may be used in combination with other alternate embodiments that are described throughout this document.

In general, as illustrated by FIG. 1, the processes enabled by the "Automated, Static Safety Verifier" begin the process of constructing a verifiably safe operating system 100 by using a source code "specification" evaluation module 120 to evaluate annotated source code 105 that defines an OS nucleus. This evaluation is intended to verify that allowed behaviors (i.e., the "specifications") associated with each instruction are consistent with those instructions (See Section 2.4). In general, the annotations for each instruction in the source code 105 are manually added to the source code via a manual annotation module 110. As discussed in further detail in Section 2.4, the purpose of the annotations on the source code is to provide "specifications" that define "allowed behaviors" for each instruction of the source code.

Assuming that the source code "specification" evaluation module 120 determines that all instructions in the OS nucleus are verified with respect to their allowed behaviors, the source code "specification" evaluation module 120 passes the verified OS nucleus source code 125 to a verified source code compilation module 130. The verified source code compilation module 130 then compiles the OS nucleus source code to produce an operating system nucleus 135 supplying "well-formed" stacks and objects (see prior definition of "well-formed" stacks and objects in Section 1.1).

Once the OS nucleus has been compiled, the next step is to construct one or more higher level program elements (including at least an OS kernel) that are to be run on top of the OS Nucleus. The source code 140 for the higher level elements includes kernel source code 145 and/or other application source code 150. In either case, the source code 140 for the higher level program elements is provided to a source code interaction verification module 155. In general, the source code interaction verification module 155 operates by automatically verifying that the source code 140 of the higher level program elements safely interacts with the well-formed stacks and objects of the compiled operating system nucleus 135.

Assuming that the source code interaction verification module 155 successfully verifies each instruction in the source code 140 for a particular higher level program element (such as the kernel), then that verified program element source code 160 is passed to a verified program element source code compilation module 165. In general, the verified program element source code compilation module 165 simply compiles the verified program element source code 160 to construct corresponding compiled program elements 170.

An OS construction module 175 then uses a conventional linker to combine the compiled OS Nucleus and the 135 and the compiled program elements 170 to construct the verifiably safe OS 100. As described in specific detail throughout Section 2, and with respect to FIG. 2 and FIG. 3, the verifiably safe OS 100 correctly supplies well-formed stacks and objects when that OS is executed on compatible CPU type hardware.

2.0 Operational Details of the "Automated, Static Safety Verifier":

The above-described program modules are employed for implementing various embodiments of the "Automated, Static Safety Verifier". As summarized above, the "Automated, Static Safety Verifier" provides various techniques for using typed assembly language (TAL) and Hoare logic to achieve highly automated, static verification of both type and memory safety of an operating system. The following sections provide a detailed discussion of the operation of various embodiments of the "Automated, Static Safety Verifier", and of exemplary methods for implementing the program modules described in Section 1 with respect to FIG. 1. In particular, the following sections provide examples and operational details of various embodiments of the "Automated, Static Safety Verifier", including: an operational overview of the "Automated, Static Safety Verifier"; tools for constructing a "safe" OS; the Nucleus interface; the Nucleus source code instruction specifications; and Nucleus implementation and verification.

2.1 Operational Overview and Advantages:

As noted above, the "Automated, Static Safety Verifier"-based processes described herein provide various techniques for using typed assembly language (TAL) and Hoare logic to achieve highly automated, static verification of both type and memory safety of an operating system. In providing these techniques, the "Automated, Static Safety Verifier" described herein provides a number of advantages conventional verification schemes.

First, the "Automated, Static Safety Verifier" is capable of producing an operating system (i.e., SafeOS) that is believed to be the first OS that is mechanically verified to ensure type safety. Furthermore, every assembly language instruction that runs after booting is statically verified without the need to trust a high-level-language compiler or any unverified library code. Further, an OS such as SafeOS is a real system—tested embodiments of SafeOS has been observed to boot and run on real, off-the-shelf x86 hardware while supporting a variety of language features, including classes, virtual methods, arrays, preemptive threads, etc. Note that while the exemplary SafeOS is described herein as being operable on x86 hardware, the use of x86 hardware is described only for purposes of explanation. In fact, it should be clear that, as with many other OS's or applications, the "Automated, Static Safety Verifier" can be used to construct a safe OS for any other desired CPU architecture by ensuring that the underlying code includes the proper instructions for operating on whatever CPU architecture is desired.

Figure 3:
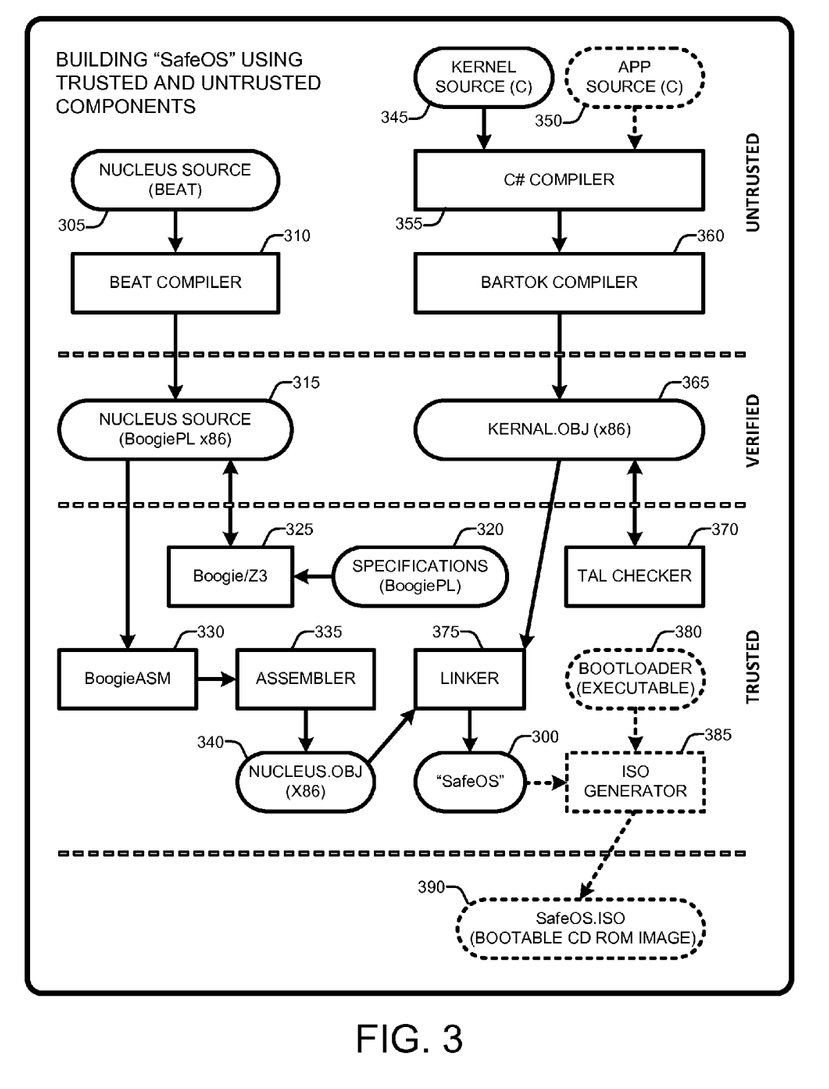
FIG. 3 provides an exemplary flow diagram illustrating how a verifiably safe operating system such as "SafeOS" is constructed from untrusted and trusted components, as described herein

Another advantage of the "Automated, Static Safety Verifier" is that it is efficient. As illustrated by FIG. 3, it supports efficient kernel TAL code 345 (written in C#) or other application source code 350 generated by an optimizing C#-to-TAL compiler, i.e., "Bartok" 360 (or similar complier), using Bartok's native layouts for objects, method tables, and arrays, following compilation to C# using a conventional C# compiler 355. Further, it incorporates the code from the verified garbage collectors described in the aforementioned co-pending U.S. patent application Ser. No. 12/362,444, entitled "Automatic Region-Based Verification of Garbage Collectors", which can run realistic macro-benchmarks at near the performance of Bartok's native garbage collectors.

These and other examples provided throughout this document demonstrate that automated techniques (e.g., TAL and automated theorem proving) are powerful enough to verify the safety of the complex, low-level code that makes up an operating system and run-time system. Furthermore, it demonstrates that a small amount of code verified with automated theorem proving can support an arbitrarily large amount of TAL code.

2.2 Tools for Constructing a "Safe Operating System":

Two verification technologies, TAL and automated theorem proving, drive the design of a safe OS such as the exemplary SafeOS described herein. These technologies are complementary. On one hand, TAL is relatively easy to generate, since the compiler automatically turns C# code (again, other coding languages can be used, if desired) into TAL code, relying only on lightweight type annotations already present in the C# code. This enables TAL to scale easily to large amounts of code. For the exemplary OS described herein, SafeOS, the Bartok compiler was used to generate TAL code from C# code, as illustrated by FIG. 3, though again, other compilers providing similar functionality may also be used.

Figure 2:
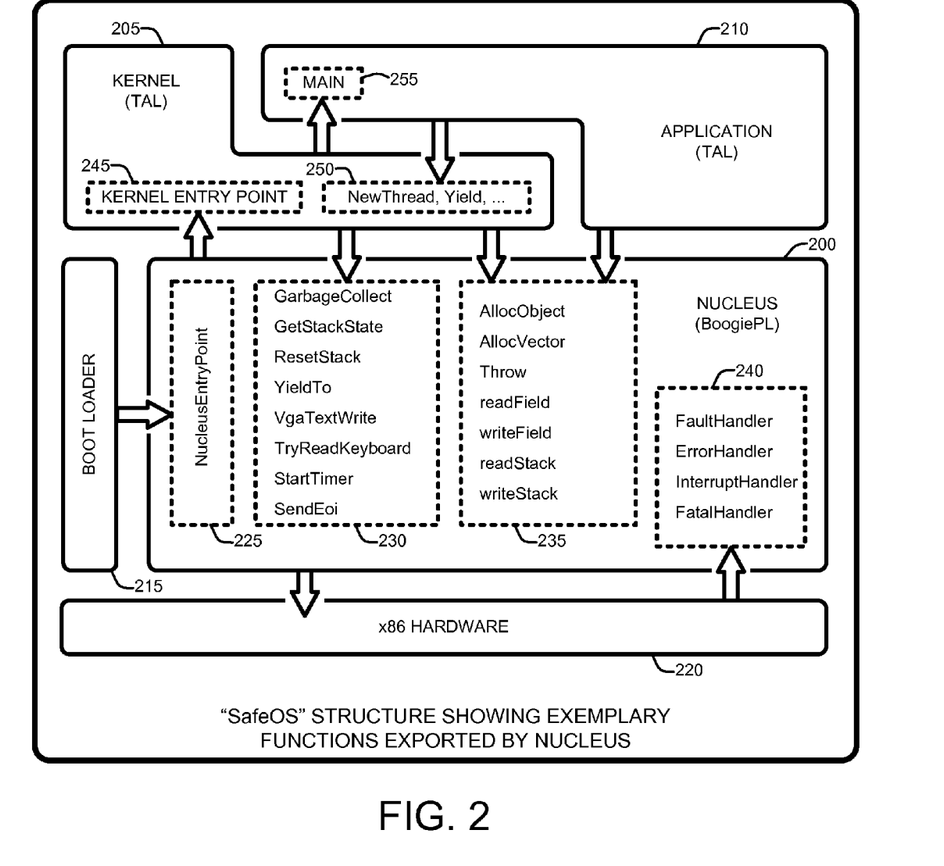
FIG. 2 provides an exemplary a structure for verifiably safe operating system (i.e. "SafeOS") constructed using the "Automated, Static Safety Verifier", as described herein.

On the other hand, automated theorem provers can verify deeper logical properties about the code than a typical TAL type system can express. Leveraging this power requires more effort, though, in the form of heavyweight programmersupplied preconditions, postconditions, and loop invariants. To exploit the tradeoff between TAL and automated theorem proving, the operating system code (e.g., SafeOS) was split code into two parts, as illustrated by FIG. 2: a Nucleus 200, verified with automated theorem proving, and a kernel 205, verified with TAL. The difficulty of theorem proving motivated the balance between the two parts: only the functionality that TAL could not verify as safe went into the Nucleus; all other code went into the kernel, which is then separately verified. Note that FIG. 2 is discussed in further detail below.

In a tested embodiment of the "Automated, Static Safety Verifier", the Nucleus's source code is not expressed in TAL, but rather in Boogie's programming language, called BoogiePL (or just "Boogie" as discussed in the aforementioned copending U.S. patent application), so that the Boogie verifier can check it. Since the Nucleus code consists of assembly language instructions, these assembly language instructions must appear in a form that the Boogie verifier can understand. As described in detail below, in constructing a safe OS such as SafeOS, assembly language instructions were encoded as sequences of calls to BoogiePL procedures (e.g. an "Add" procedure, a "Load" procedure, etc.), so that the Boogie verifier could check that each instruction's preconditions were satisfied. After Boogie verification, a separate tool, described in the aforementioned copending U.S. patent application, extracts standard assembly language instructions from the BoogiePL code. A standard assembler then turns these instructions into an object file (i.e., the code is compiled via the assembler) for later linking with the kernel and/or other verified higher level program elements to construct the overall verifiably safe OS.

Rather than hand-code the entire Nucleus in assembly language, some of the less performance-critical parts were written in a high-level extension of BoogiePL referred to as "Beat". The (non-optimizing) Beat compiler transforms verifiable Beat expressions and statements into verifiable BoogiePL assembly language instructions. Note however, that if desired, the entire Nucleus can be hand-coded in assembly language, or generated using other tools. In other words, the basic idea is to provide assembly language for the entire Nucleus, regardless of how that code is generated. However, for purposes of explanation, the remainder of this discussion will assume the use of BoogiePL code.

Note, however, that none of the compilers used are considered a part of the trusted computing base. In fact, it is not necessary to trust the compilers to ensure the correctness of the Nucleus and safety of the operating system, such as SafeOS, as a whole. As shown in FIG. 3, the TAL checker 370 and Boogie/Z3 verifier 325 check that the output (e.g., nucleus source 315 and compiled kernel 365 or other compiled application) of the compilers (360 and 310, respectively) conforms to the TAL type system and the Nucleus specification 320, respectively, so it is only necessary to trust these checkers.

Beyond the TAL checker 370 and Boogie/Z3 verifiers 325, FIG. 3 shows additional components in SafeOS's trusted computing base: the assembler 335, the linker 375, the ISO CD-ROM image generator 385, and the boot loader 380. Clearly, some of these components are optional (such as, for example, the ISO CD-ROM image generator 385) and are provided only for ease of use. In addition, the trusted computing base includes the specification 320 of correctness for the Nucleus's BoogiePL code 315. This includes specifications 320 of the behavior (also referred to herein as "allowed behaviors" or "annotations") of functions exported by the Nucleus 200, shown in FIG. 2. For example, referring back to FIG. 2, the specification of "YieldTo" (within element 230 of FIG. 2) ensures that the Nucleus 200 sets the stack pointer to the top of the correct stack during a yield. The specification of correctness also includes specifications for assembly language instructions and for interaction with hardware devices and memory. Note that all Boogie specifications are written as first-order logic formulas in the BoogiePL language.

By expressing and checking properties at a low level (assembly language), non-trivial properties can be ensured with high confidence. The remainder of the discussion of the overall "Automated, Static Safety Verifier" focuses on these properties, with an emphasis on the specification and verification of the Nucleus's correctness properties. In particular Section 2.3 discusses the Nucleus's design, while Section 2.4 and 2.5 discuss specification and verification of the Nucleus. The kernel is discussed in detail in Section 2.6.

2.3 "Nucleus" Interface:

The Nucleus consists of a set of functions necessary to support the TAL code that runs above it. Note that a minimal set of functions is discussed with respect to SafeOS since the construction of SafeOS is provided only for purposes of explanation. Again, a more feature rich set of functions can be coded into the Nucleus, if desired. However, it should be understood that even with an automated theorem prover, Hoare-style verification is still hard work; less code in the Nucleus means less code to verify. At the same time, the set has to guarantee safety in the presence of arbitrary TAL code; it can assume that the TAL code is well typed, but can make no further assumptions about the well-formedness of the TAL code.

One optional design decision used in constructing SafeOS, which greatly simplified the Nucleus, is that, similar to designs used in recent micro-kernels, no Nucleus function ever blocks. In other words, every Nucleus function performs a finite (and usually small) amount of work and then returns. However, the Nucleus may return to a different thread than the thread that invoked the function. This allows the kernel built on top of the Nucleus to implement blocking thread operations, such as waiting on a semaphore.

The tested embodiment of the "Automated, Static Safety Verifier" used to construct SafeOS resulted in a Nucleus API consisting of just 20 functions, all shown in FIG. 2. These 20 functions (see elements 225, 230, 235 and 240 of FIG. 2), implemented with a total of about 1500x86 instructions, include 3 memory management functions (AllocObject, AllocVector, GarbageCollect), one very limited exception handling function (Throw), 3 stack management functions (GetStackState, ResetStack, YieldTo), and 4 device access functions (VgaTextWrite, TryReadKeyboard, StartTimer, SendEoi). Most of the functions are intended for use only by the kernel 205 that feeds any necessary data to the application 210 via a main function 255 or the like. Most of these functions are not intended for use by the applications 210. However, various applications 210 may call functions such as, for example, AllocObject and AllocVector directly, as illustrated by FIG. 2, depending upon how those applications are coded. Again, note that additional functions can be coded, if desired, to construct a more feature rich function set.

In this exemplary SafeOS, the Nucleus 200 exports four pseudo-functions, including: readField, writeField, readStack, and writeStack, to the kernel 205 and applications 210. These functions, described further in Section 2.4, contain no executable code, but their verification guarantees that the kernel 205 and applications 210 will find the values that they expect when they try to access fields or objects or slots on the current stack. The Nucleus 200 exports another four functions to the x86 hardware 220 for handling faults and interrupts: FatalHandler halts the system, while FaultHandler, ErrorHandler, and InterruptHandler yield execution to kernel TAL code running on a designated interrupt-handling stack. Finally, the Nucleus 200 exports an entry point, NucleusEntryPoint 225 to the boot loader 215.

As more devices are added to the system, more Nucleus functions may be required. However, a minimal Nucleus only needs to include the portion of the device interfaces critical the rest of the system's safety. For example, if desired, SafeOS could use an I/O MMU to protect the system from devices, minimizing the device code that needs to reside in the Nucleus.

Similar to the conventional verified L4 micro-kernel, seL4, SafeOS keeps interrupts disabled throughout the execution of any single Nucleus function. However, in various embodiments, interrupts can be enabled during the TAL kernel's execution, with no loss of safety. Since Nucleus functions do not block, SafeOS still guarantees that eventually, interrupts will always be re-enabled, and usually will be re-enabled very quickly. In a tested embodiment, one implementation of SafeOS sacrifices real-time interrupt handling because of one particularly long function: "GarbageCollect", which performs an entire stop-the-world garbage collection across the entire heap. However, it should be understood that such limitations are not fundamental to an OS constructed using the "Automated, Static Safety Verifier". For example, given a verified incremental garbage collector, SafeOS, or a similar operating system, could reduce the execution time of "GarbageCollect" or other garbage collector to, say, just the time required to scan the stacks (or even a single stack), rather than the time required to garbage collect the whole heap. Alternatively, SafeOS, or a similar operating system, could poll for interrupts periodically, as in seL4. However, it should be understood that actually delivering these interrupts to the kernel TAL code would still require that the garbage collector reach a state that is safe for the kernel.

The next two sections describe how the "Automated, Static Safety Verifier" specifies, implements, and verifies the Nucleus functions listed above for creation of a verifiably safe OS such as SafeOS.

2.4 "Nucleus" Source Code Instruction Specifications:

To verify that the Nucleus behaves correctly, it is necessary to specify what that correct behavior is (i.e., the "allowed behavior") via annotations on the nucleus source code. This process is not directed at the Nucleus's private, internal behaviors, but rather at how the Nucleus interacts with other components of the system. For example, the SafeOS specification of garbage collection does not specify which algorithm the garbage collector should implement (e.g., copying or mark-sweep), since the algorithm is an internal behavior that is irrelevant to the other components of the system. Instead, the specification simply says that the garbage collector must maintain the well-formedness of the stacks and heap so that, during subsequent reads and writes to the stack and heap, other components of the system behave as expected. Internally, the garbage collectors used by SafeOS do have stronger invariants about specific details of the algorithm (see the aforementioned copending U.S. patent application for a detailed description of these garbage collectors), but these invariants are kept hidden from the other SafeOS system components.

The Nucleus interacts with five components: memory, hardware devices, the boot loader, interrupt handling, and TAL code (kernel and application code). Memory and hardware devices export functionality to the Nucleus, such as the ability to read memory locations and write hardware registers. SafeOS must verify that the Nucleus satisfies the preconditions to each operation on memory and hardware. In turn, the Nucleus exports functionality to the boot loader (the Nucleus entry point), the interrupt handling (the Nucleus's interrupt handlers), and the TAL code (AllocObject, YieldTo, etc.).

SafeOS expresses the specification for interacting with these components as first-order logical formulas in BoogiePL. These formulas follow C/Java/C# syntax and consist of:

```
1. Arithmetic Operators: +, −, *, >, ==, !=, . . .
2. Boolean Operators: !, &&, ||, ==>, . . .
3. Variables: foo, Bar, old(foo), . . .
4. Boolean Constants: true, false
5. Integer Constants: 5, . . .
6. Bit Vector Contants: 5bv16, 5bv32, . . .
7. Function Application: Factorial(5), Max(3,7), IsOdd(9), . . .
8. Array Indexing: foo[3], . . .
9. Array Update: foo[3 := Bar], . . .
10. Quantified Formulas: (∀i:int::foo[i]==Factorial(i)), . . .
11. Etc.
```

BoogiePL bit vectors correspond to integers in C/Java/C#, which are limited to numbers that fit inside a fixed number of bits. BoogiePL integers, on the other hand, are unbounded mathematical integers. BoogiePL arrays are unbounded mathematical maps from some type (usually integers) to some other type. Unlike arrays in C/Java/C#, BoogiePL arrays are immutable values (there are no references to arrays, and arrays are not updated in place). An array update expression such as a[x:=y] creates a new array, which is equal to the old array a at all locations except x, where it contains a new value, y. For example, (a[x:=y])[x]==y and (a[x:=y])[x+1]==a[x+1]).

BoogiePL procedures have preconditions and postconditions, written as BoogiePL logical formulas such as the exemplary procedure illustrated below:

```
var a:int, b:int;
procedure P(x:int, y:int)
    requires a < b && x < y;
    modifies a, b;
    ensures a < b && a == x + old(a);
    {
        a := a + x;
        b := b + y;
    }
```

In the above example, the procedure "P" can only be called in a state where global variable "a" is less than global variable "b", and the parameter "x" is less than the parameter "y", i.e., "requires a <b&&x<y". Upon exit, the procedure's postconditions ensure that "a" is still less than "b", and that "a" is equal to "x" plus the old version of "a" (before P executed), i.e., "ensures a <b&&a==x+old(a)". Note that the procedure must explicitly reveal all the global variables that it modifies, i.e., "modifies a, b" in this example, so that callers to the procedure will be aware of the modifications.

For each function exported to the boot loader, interrupt handling, and TAL code, the Nucleus implements a BoogiePL procedure whose specification is given in terms of one or more "requires", "ensures", and "modifies" clauses. The Nucleus implements these procedures in terms of more primitive hardware procedures: each BoogiePL procedure exported from the memory and hardware devices to the Nucleus corresponds to exactly one assembly language instruction, such as an instruction to read a single memory location or write to a single hardware register.

In order to convey concretely what the Nucleus specification and verification entail, Sections 2.4.1 through 2.4.5 describe in detail the BoogiePL specifications of the Nucleus's interaction with the memory (Section 2.4.1), hardware devices (Section 2.4.2), boot loader (Section 2.4.3), interrupt handling (Section 2.4.4), and TAL code (Section 2.4.5).

2.4.1 Memory:

SafeOS's initial memory layout is set by the boot loader. In a tested embodiment, SafeOS uses a conventional pre-existing boot loader (though custom boot loaders can be created, if desired) which sets up an initial virtual-memory address space (i.e., it sets up a page table), loads the executable image into memory, and jumps to the executable's entry point, passing detailed information about the memory layout to the entry point. The boot-loader-supplied address space simply maps virtual memory directly to physical memory, except for a small range of low addresses that are left unmapped (to catch null pointer dereferences). Generally, a traditional operating system would create new virtual memory address spaces to protect applications from each other. However, unlike traditional operating systems, SafeOS guarantees type safety, and can therefore rely on type safety for protection. Consequently, SafeOS, or any other OS constructed using the "Automated, Static Safety Verifier" can simply keep the initial boot-loader-supplied address space, thereby increasing overall OS efficiency. Note however, that this is not a requirement of the "Automated, Static Safety Verifier", and that, if desired, the OS can be coded to create new virtual memory address spaces.

SafeOS's mapped address space consists of three parts. First is the memory occupied by the executable image, including code, static fields, method tables, and gc tables (i.e., garbage collection tables). SafeOS may read this memory, but may write only to the static fields, not the code or tables. Second, the SafeOS specification reserves the memory just above the executable image for the interrupt table. SafeOS may write to the table, but it can only write values that obey the specification for interrupt handlers. Third, the remaining memory above the interrupt handler is general-purpose memory, free for arbitrary use; the Nucleus may read and write it at any time as it wishes, as long as it ensures the well-formedness of the heap and current stack before transferring control to TAL code, as discussed in section 2.4.5.

The specification describes the state of general-purpose memory using a global variable "Mem", which is an array that maps integer byte addresses to integer values. For any 4-byte-aligned address "i" in general-purpose memory, Mem[i] contains the 32-bit memory contents stored at address i, represented as an integer in the range $0 \ldots 2^{32}-1$. The memory exports two operations to the Nucleus, Load and Store, as illustrated below:

```
procedure Load(ptr:int) returns (val:int);
    requires memAddr(ptr);
    requires Aligned(ptr);
    modifies Eip;
    ensures word(val);
    ensures val == Mem[ptr];
procedure Store(ptr:int, val:int);
    requires memAddr(ptr);
    requires Aligned(ptr);
    requires word(val);
    modifies Eip, Mem;
    ensures Mem == old(Mem)[ptr := val];
```

Each of these two operations requires a 4-byte-aligned pointer ("Aligned( . . . )") to memory inside the general-purpose memory region ("memAddr( . . . )"). The loaded or stored value must be in the range $0 \ldots 2^{32}-1$ ("word( . . . )"). Any Store operation updates the contents of Mem, so that subsequent Load operations are guaranteed to see the updated value. Loads and Stores have an additional side effect, noted in the modifies clause: they modify the current instruction pointer (program counter), "Eip".

The executable image memory exports its own load/store interface to the Nucleus, but with a store operation that applies only to static fields.

Finally, the interrupt table exports a store operation that allows the Nucleus to write to the interrupt descriptor table (IDT). On x86 processors, the interrupt descriptor table contains a sequence of 8-byte entries that describe what code the processor should jump to when receiving various kinds of faults and interrupts. This is a very sensitive data structure, since an invalid entry could cause a jump to an arbitrary address in memory, which would be unsafe. Theoretically, it is possible to use general-purpose memory for the interrupt table, and to guarantee the well-formedness of the interrupt table whenever the Nucleus transfers control to TAL code, with the Nucleus being allowed to arbitrarily modify the interrupt table temporarily, which would be safe while interrupts are disabled. However, some x86 platforms support "non-maskable interrupts", which can occur even with interrupts disabled. Therefore, in case such an interrupt ever occurred, it is considered safer to transfer control to a designated fatal error handler than allowing arbitrary behavior. Therefore, in a tested embodiment of the SafeOS, the interrupt table exports an interface that only allows stores of approved entries, as illustrated by the exemplary procedure "IdtStore" shown below:

```
procedure IdtStore(entry:int, offset:int, handler:int, ptr:int, val:int);
    requires 0 <= entry && entry < 256;
    requires (offset == 0 && val == IdtWord0(handler))
        || (offset == 4 && val == IdtWord4(handler));
    requires IsHandlerForEntry(entry, handler);
    requires ptr == idtLo + 8 * entry + offset;
    modifies Eip, IdtMem, IdtMemOk;
    ensures IdtMem == old(IdtMem)[ptr := val];
    ensures IdtMemOk == old(IdtMemOk)[ptr := true];
```

Using IdtStore, the Nucleus may write to either 4-byte word of any 8-byte entry in the table, as long as the word describes a valid interrupt handler for the entry. After a valid word is written to address ptr, the specification updates an array of Booleans "IdtMemOk" to reflect that the word at address ptr is now valid. In the case of x86 processors, valid words obey a strange Intel specification that splits the handler's address across the two words in 16-bit pieces; the BoogiePL for this specification is shown for purposes of explanation and to demonstrate that SafeOS can deal with such low-level architectural details safely (and, or, and shl are 32-bit bitwise AND/OR/SHIFT-LEFT), as illustrated below:

```
function IdtWord0(handler:int) returns(int) {
    or(shl(CSS, 16), and(handler, 0x0000ffff))
}
function IdtWord4(handler:int) returns(int) {
    or(and(handler, 0xffff0000), 0x8e00)
}
```

2.4.2 Hardware Devices:

SafeOS currently supports four hardware devices: a programmable interrupt controller (PIC), a programmable interval timer (PIT), a VGA text screen, and a keyboard. Again, it must be understood that SafeOS was constructed using the "Automated, Static Safety Verifier" for purposes of explanation and to demonstrate operation of the "Automated, Static Safety Verifier". As such, it should be clear that an arbitrary safe OS having support for an arbitrary number and type of hardware devices can be constructed using the techniques and procedures described herein. The interaction with this hardware is specified using unbounded streams of events. The Nucleus delivers events to the PIC, PIT, and screen, and it receives events from the keyboard. For the screen, the events are commands to draw a character at a particular position on the screen. For the keyboard, events are keystrokes received from the keyboard. For the PIC and PIT, particular sequences of events initialize interrupt handling and start timers.

The keyboard specification of SafeOS is presented as an example of a typical hardware device. SafeOS represents the stream of events from the keyboard as an immutable array KbdEvents mapping event sequence numbers (represented as integers, starting from 0) to events (also represented as integers). As the Nucleus queries the keyboard, it discovers more and more events from the stream. Two indices into the array, KbdAvailable and KbdDone, indicate the state of the Nucleus's interaction with the keyboard. Events 0 . . . KbdDone-1 have already been read by the Nucleus, while events KbdDone . . . KbdAvailable-1 are available to read, but have not yet been read.

Two operations, each a single 8-bit x86 assembly language I/O instruction, query the keyboard. By invoking KbdStatusIn8, the Nucleus discovers the current state of KbdAvailable and KbdDone. If this operation places a 0 in the eax register's lowest bit, then no events are available; if the operation places a 1 in eax's lowest bit, then at least one bit is available. If the Nucleus can prove that at least on event is available, it may call KbdDataIn8, as illustrated below, to receive the first available event.

```
var KbdEvents:[int]int;
var KbdAvailable:int, KbdDone:int;
procedure KbdStatusIn8( );
    modifies Eip, eax, KbdAvailable;
    ensures and(eax,1) == 0 ==> KbdAvailable==KbdDone;
    ensures and(eax,1) !=0 ==> KbdAvailable > KbdDone;
procedure KbdDataIn8( );
    requires KbdAvailable > KbdDone;
    modifies Eip, eax, KbdDone;
    ensures KbdDone == old(KbdDone) + 1;
    ensures and(eax,255) == KbdEvents[old(KbdDone)];
```

2.4.3 Boot Loader and Nucleus Initialization:

Interaction with the boot loader, interrupt handling, and TAL code is specified by preconditions and postconditions on Nucleus-implemented procedures. The first such procedure to execute is the Nucleus entry point, NucleusEntryPoint. When booting completes, the boot loader transfers control to NucleusEntryPoint. Note that after this control transfer, no boot loader code ever runs again during the current OS execution. The Nucleus entry point implementation (i.e., "NucleusEntryPoint") must obey the following specification (note that for brevity, some of the requires, modifies, and ensures clauses are omitted):

```
procedure NucleusEntryPoint(...);
    requires...idtLo == ro32(ro32(ecx+40)+72+0)
        && memHi == ro32(ro32(ecx+40)+72+8)+idtLo
    ...
    requires RET == ReturnToAddr(KernelEntryPoint);
    requires S == 0;
    ...
    ensures esp == StackHi(S) − 4 && ebp == 0;
    ensures StackCheckInv(S, StackCheck);
    ensures IdtOk & & PicOk(...) && TimerOk(...);
    ensures NucleusInv(S,StackState[S:=StackRunning],...);
```

The boot loader passes information about available memory in the ecx register. This information supplies the Nucleus with the bounds of the memory above the executable image, which ranges from the low end of the interrupt table (idtLo) to the high end of general-purpose memory. (The function ro32 maps each address in read-only memory to the 32-bit value stored at that address.)

The "RET" value specifies how the procedure must return. It equals one of two values: ReturnToAddr(i), which specifies that the procedure must perform a normal return (the x86 ret instruction) to address i, or ReturnToInterrupted(i, cs, eflags), which specifies that the procedure must perform an interrupt return (the x86 iretd instruction) to return address i, restoring code segment cs and status flags eflags. The "NucleusEntryPoint" specification shown above requires that the Nucleus entry point return to the TAL kernel entry point. Notice that Nucleus functions do not necessarily return to their direct caller; the Nucleus entry point returns to TAL, not to the boot loader. Furthermore, the Nucleus entry point must set correct initial stack pointer (esp) and frame pointer (ebp) values. It must also set a global variable StackCheck with the address of the low end of the stack; TAL functions compare the stack pointer to StackCheck to check for stack overflow.

Several postconditions ensure that devices and interrupts are set up correctly: IdtOk guarantees that the Nucleus has completely filled in the interrupt table and set up the x86's pointer to the interrupt table, PicOk guarantees that the Nucleus has initialized the programmable interrupt controller, and TimerOk guarantees that the Nucleus has initialized the programmable interval timer.

One of the Nucleus's key roles is to manage multiple stacks, so that the TAL kernel can implement multiple threads. Note that to distinguish the Nucleus's functionality from the kernel's functionality, it is said that the Nucleus implements "stacks" and the kernel implements "threads". The specification uses two variables, S and StackState, to specify the current state of the SafeOS stacks. Stacks are numbered starting from 0, and S contains the current running stack. The Nucleus entry point specification S=0 indicates that the nucleus should run the TAL kernel entry point in stack 0. At any time, each stack s is in one of four states, specified by StackState[s]: empty, running, yielded, or interrupted. Initially, stack 0 is set to running (StackRunning), and all other stacks are empty. When TAL code is interrupted, its current stack's state changes to interrupted. When TAL code voluntarily yields, its current stack's state changes to yielded.

NucleusEntryPoint's final postcondition sets up the Nucleus's private invariant, "NucleusInv". This invariant is a Nucleus-specified function that takes as arguments the Nucleus's private global variables, along with some specification variables like Mem, S, and StackState. The Nucleus may define NucleusInv any way it wants. If it defines too weak an invariant (e.g. NucleusInv( . . . )=true), though, then the Nucleus will be not have enough information to implement other Nucleus functions, such as allocation. On the other hand, if the invariant is too strong (e.g. Nucleus-Inv( . . . )=false), the Nucleus entry point will not be able to ensure it in the first place. However, for successful verification, the Nucleus must define an invariant strong enough to ensure the well-formedness of the stacks and heaps, as well as the well-formedness of the Nucleus's own internal data structures.

2.4.4 Interrupt Handling:

After the TAL kernel begins execution in stack 0, it voluntarily yields control to another stack and enables interrupts. When a stack voluntarily yields, its state changes from StackRunning to StackYielded(_ebp, _esp, _eip), where _ebp, _esp, and _eip indicate the values that the stack pointer, frame pointer, and instruction pointer, respectively, must be restored with in order to resume the stack's execution.

Upon receiving an interrupt or fault, the Nucleus's interrupt and fault handlers (InterruptHandler, FaultHandler, and ErrorHandler) transfer control back to the TAL code in stack 0, which then services the interrupt or fault. To specify this behavior, the handler procedure's preconditions and postconditions force the interrupt and fault handlers to restore stack 0's stack and frame pointers and return to stack 0's instruction pointer, as illustrated below:

```
procedure InterruptHandler(...);
    requires NucleusInv(S, ...);
    requires (Tag(StackState[0])==STACK_YIELDED ==>
        RET == ReturnToAddr(eip)
        && StackState[0]==StackYielded(_ebp, _esp, _eip));
    ...
    ensures (Tag(StackState[0])==STACK_YIELDED ==>
        NucleusInv(0, ...)
        && ebp == _ebp && esp == _esp);
```

The interrupted stack changes from state StackRunning to state, as illustrated below:
StackInterrupted(_eax,_ebx,_ecx,_edx,_esi,_edi, _ebp,_esp,_eip,_cs,_efl)

The values_eax . . . _efl indicate the ×86 registers that must be restored to resume the interrupted stack's execution. Note that in the case that a safe operating system constructed using the "Automated, Static Safety Verifier", such as SafeOS, is designed to handle floating point code, floating point states would also need to be restored.

SafeOS verifies the correctness of the Nucleus, but only verifies the safety of the kernel. As a result, a buggy TAL kernel might leave stack 0 in some state besides yielded. For example, a buggy kernel might enable interrupts while running in stack 0, which could cause stack 0 to be in the running state when an interrupt occurs. Therefore, to ensure safety even in the presence of a buggy kernel, the Nucleus checks stack 0's state at run-time; if it not in the yielded state, the Nucleus halts the system to ensure safety.

2.4.5 TAL Kernel and Applications:

As illustrated by FIG. 2, the Nucleus 200 exports various functions directly to TAL code. First, it exports three stack manipulation functions to the TAL kernel 205: GetStackState, ResetStack, and YieldTo. GetStackState simply returns the state of any stack. ResetStack changes the state of a stack to empty; the kernel 205 may use this to terminate an unused thread. Finally, YieldTo transfers control to another stack. The exact behavior of YieldTo depends on the state of the target stack that is being yielded to. If the target stack is in the yielded or interrupted state, YieldTo restores the target stack's state and resumes its execution. If the target state is in the empty state, YieldTo runs the TAL kernel's entry point 245 in the target stack; the kernel uses this to start new threads 250. If the target state is in the running state, then the stack is switching to itself; in this case, YieldTo simply returns. For brevity, most of the specification for YieldTo is omitted in the example below, however, it looks much like InterruptHandler's specification from section 2.4.4, but with cases for all four stack states, rather than just for the yielded state:

```
procedure YieldTo(...);
    requires NucleusInv(S, ...);
    requires ScanStackInv(S, ..., esp, ebp);
    requires
        (StackState[s]==StackRunning && s==S
            && RET==ReturnToAddr(Mem[esp]))
        || (StackState[s]==StackYielded(_ebp,_esp,_eip)
            && RET==ReturnToAddr(_eip))
        || (StackState[s]==StackInterrupted(_eax,...,_efl)
            && RET==ReturnToInterrupted(_eip,_cs,_efl))
        || (StackState[s]==StackEmpty
            && RET==ReturnToAddr(KernelEntryPoint)
        && ...);
    ...
```

YieldTo differs from InterruptHandler in one crucial respect. In particular, when TAL code voluntarily calls a Nucleus function, the TAL leaves its stack contents in a state that the verified garbage collector can scan: the garbage collector (GC) follows the chain of saved frame pointers until it reaches a saved frame pointer equal to 0. For each frame, the collector uses the frame's return address as an index into tables of GC information. In contrast, an interrupted stack is not necessarily scannable. The requirement ScanStackInv( . . . ) expresses the layout of the stack that allows scanning by the garbage collector.

In a tested embodiment of SafeOS, the Nucleus exports several run-time system functions to both the TAL kernel and TAL application code: AllocObject, AllocVector, GarbageCollect, and Throw. Again, it must be understood that SafeOS was constructed using the "Automated, Static Safety Verifier" for purposes of explanation and to demonstrate operation of the "Automated, Static Safety Verifier". As such, it should be clear that the Nucleus an arbitrary safe OS constructed using the techniques and procedures enabled by the "Automated, Static Safety Verifier" can be designed to export additional functions.

Given this understanding, the exemplary SafeOS implements only trivial exception handling: when TAL tries to throw an exception, Throw simply terminates the current stack by setting its state to empty and transferring control to stack 0. Note that SafeOS takes its allocation and garbage collection implementations (both mark-sweep and copying collection) from the verified garbage collection procedures described in the aforementioned copending U.S. patent application. However, SafeOS makes minor changes to the allocation and GC implementation described in the aforementioned copending U.S. patent application. First, the allocators return null when the heap is full, rather than invoking garbage collection directly. This allows the TAL kernel to schedule the remaining threads to prepare for garbage collection, as described in section 2.6. Second, the original verified collectors described in the aforementioned copending U.S. patent application scanned only a single stack. In contrast, SafeOS adds a loop to the original scanning technique so that SafeOS is capable of scanning all of the stacks.

The verified garbage collectors export functions readField and writeField that read and write heap object fields on behalf of the TAL code. More precisely, these functions grant the TAL code permission to read and write fields of objects, by ensuring that the fields reside at valid memory locations and, for reads, that the fields contain the correct value. The "correct value" is defined by an abstract heap that the specification maintains. The key invariant in the garbage collector verification is that the concrete values stored in memory accurately reflect the abstract heap whenever the TAL code is running.

SafeOS extends the abstract heap with multiple abstract stacks, each consisting of zero or more abstract stack frames. The Nucleus exports functions readStack and writeStack that guarantee that the concrete stack contents in Mem match the abstract contents. As with conventional systems, this matching is loose enough to allow the garbage collector to update concrete pointers as objects move in memory (since the copying collector moves objects). In the specification for readStack, the InteriorValue predicate matches a concrete value "val" at memory address "ptr" to the abstract value at offset "j" in the "abstract frame" frame of the current stack S, as illustrated below:

```
procedure readStack(ptr:int, frame:int, j:int) returns(val:int);
    requires StackState[S] == StackRunning;
    requires NucleusInv(S,...);
    requires 0 <= frame < FrameCounts[S];
    requires ...
    ensures ...
    ensures val == Mem[ptr];
    ensures InteriorValue(val,...,FrameAbs[S][frame][j],...);
```

The name "InteriorValue" reflects the fact that a stack value might be an "interior" pointer to the inside of an object, which the garbage collector must properly track, as discussed in the aforementioned copending U.S. patent application. Note that readStack does not modify the instruction pointer, Eip, because it contains no instructions (the same is true for readField, writeField, and writeStack). Because of this, the TAL code need not generate any code to call readStack at run-time. Instead, it simply reads the data at Mem[ptr] directly.

Finally, the Nucleus exports device management functions to the TAL kernel: VgaTextWrite, TryReadKeyboard, StartTimer, and SendEoi (send end-of-interrupt). The specification for TryReadKeyboard, for example, requires that the Nucleus return a keystroke (in the range 0-255) if one is available, and otherwise return the value 256:

```
procedure TryReadKeyboard( );
    ...
    ensures KbdAvailable==old(KbdDone) ==> eax==256;
    ensures KbdAvailable> old(KbdDone) ==>
        eax==KbdEvents[old(KbdDone)];
```

2.5 Nucleus Implementation and Verification:

SafeOS expands on the ideas described in the aforementioned copending U.S. patent application by using BoogiePL to express verified assembly language instructions, but improves on the earlier work by generating much of the verified assembly language automatically from higher-level source code. The verified assembly language code is illustrated below with a small, but complete, example representing the verified source code implementing TryReadKeyboard:

```
implementation TryReadKeyboard( ) {
    call KeyboardStatusIn8( );
    call eax := And(eax, 1);
    call Go( ); if (eax != 0) {goto skip;}
        call eax:=Mov(256);
        call Ret(old(RET)); return;
    skip:
    call KeyboardDataIn8( );
    call eax := And(eax, 255);
    call Ret(old(RET)); return;
}
```

As illustrated by FIG. 3, to verify this, the "Automated, Static Safety Verifier" simply runs the Boogie tool 325 on the source code, which queries the Z3 theorem prover to check that the procedure satisfies its postconditions, and that all calls inside the procedure satisfy the necessary preconditions (i.e., the specifications 320). Given the BoogiePL source code 315, this process is entirely automatic, requiring no scripts or human interactive assistance to guide the theorem prover.

Each statement in the verified BoogiePL code 315 corresponds to 0, 1, or 2 assembly language instructions. "If" statements require 2 instructions, a compare and branch. Dynamically checked arithmetic statements also require 2 instructions, an arithmetic operation followed by a jump-on-overflow. BoogieAsm 330, a tool developed for use with the ideas described in the aforementioned copending U.S. patent application, then transforms this verified BoogiePL source code 315 into valid assembly code, as illustrated below:

```
_?TryReadKeyboard proc
    in al, 064h
    and eax, 1
    cmp eax, 0
    jne TryReadKeyboard$skip
    mov eax, 256
    ret
TryReadKeyboard$skip:
    in al, 060h
    and eax, 255
    ret
```

BoogieAsm 330 checks that the source code 315 contains no circular definitions of constants or functions (which would cause the verification to be unsound), and no recursive definitions of procedures (which the translator currently cannot generate code for as with the aforementioned copending U.S. patent application. BoogieAsm 330 also checks that the verified source code 315 conforms to a restricted subset of the BoogiePL syntax. For example, before performing an "if" or "return" statement, the code must perform call Go( ) or call Ret(old(RET)) operations to update the global variables that reflect the machine state, as illustrated below:

```
procedure Go( );
    modifies Eip;
procedure Ret(oldRET:ReturnTo);
    requires oldRET == ReturnToAddr(Mem[esp]);
    requires Aligned(esp);
    modifies Eip, esp;
    ensures esp == old(esp) + 4;
    ensures Aligned(esp);
```

Writing such detailed, annotated assembly language by hand is hard work, and the resulting code is often difficult to read. To relieve some of this burden and clarify the code, a small extension of BoogiePL called Beat 310 was developed for use by the "Automated, Static Safety Verifier". Beat 310 provides some conveniences, such as defining named aliases for x86 assembly language registers, and very simple high-level-to-assembly-level compilation of statements and expressions. This aids readability, since named variables and structured control constructs (such as "if/else" and "while") are easier to read than unstructured assembly language branches, without straying too far from the low-level assembly language model. The close correspondence between the Beat code and the generated assembly language ensures that verifiable Beat compiles to verifiable BoogiePL assembly language. For non-performance-critical code, Beat's 310 high-level statements were used rather than writing assembly language instructions directly.

2.6 Kernel:

As illustrated by FIG. 2, on top of the Nucleus 200, SafeOS provides a simple kernel 205, written in C# and compiled to TAL. This kernel follows closely in the footsteps of other operating systems developed in safe languages, so this section focuses on the interaction of the kernel with the Nucleus. Again, it must be understood that SafeOS was constructed using the "Automated, Static Safety Verifier" for purposes of explanation and to demonstrate operation of the "Automated, Static Safety Verifier". As such, it should be clear that the kernel of an arbitrary safe OS constructed using the techniques and procedures enabled by the "Automated, Static Safety Verifier" can have significantly more functionality than the exemplary kernel described below.

In general, the kernel constructed for the SafeOS implements round-robin preemptive threading on top of Nucleus stacks, allowing threads to block on semaphores. The kernel scheduler maintains two queues: a ready queue of threads that are ready to run, and a collection queue of threads waiting for the next garbage collection. A running thread may voluntarily ask the kernel to yield. In this case, the thread goes to the back of the ready queue. The scheduler then selects another thread from the front of the ready queue and calls the Nucleus YieldTo function to transfer control to the newly running thread.

The kernel TAL code may execute the x86 disable-interrupt and enable-interrupt instructions whenever it wishes. While performing scheduling operations, the kernel keeps interrupts disabled. It enables interrupts before transferring control to application TAL code. Thus, a thread running application code may be interrupted by a timer interrupt. When this happens, the Nucleus transfers control back to the kernel TAL code running on stack 0. This code uses the Nucleus GetStackState function to discover that the previously running thread was interrupted. It then moves the interrupted thread to the back of the scheduler queue, and calls YieldTo to yield control to a thread from the front of the ready queue.

When an application asks the kernel to spawn a new thread, the kernel allocates an empty Nucleus stack, if available, and places the new thread in the ready queue. When the empty thread runs (via a scheduler call to YieldTo), it enters the kernel's entry point, KernelEntryPoint, which calls the application code. When the application code is finished running, it may return back to KernelEntryPoint, which marks the thread as "exited" and yields control back to the kernel's stack 0 code. The stack 0 code then calls ResetThread to mark the exited thread's stack as empty (and thus available for future threads to use). Note that KernelEntryPoint is not allowed to return, since it sits in the bottom-most frame of its stack and has no return address to return to. The TAL checker verifies that KernelEntryPoint never tries to return, simply by assigning KernelEntryPoint a TAL type that lacks a return address to return to.

Applications may allocate and share semaphore objects to coordinate execution among threads. The SafeOS keyboard driver, for example, consists of a thread that polls for keyboard events and signals a semaphore upon receiving an event. Each semaphore supports two operations, Wait and Signal. If a running thread requests to wait on a semaphore, the kernel scheduler moves the thread into the semaphore's private wait queue, so that the thread blocks waiting for someone to signal the thread. A subsequent request to signal the semaphore may release the thread from the wait queue into the ready queue.

The kernel's scheduler also coordinates garbage collection. The well-known Bartok compiler was modified so that at each C# allocation site, the compiler generates TAL code to check the allocator's return value. If the value is null, the TAL code calls the kernel to block awaiting garbage collection, then jumps back to retry the allocation after the collection. The kernel maintains a collection queue of threads waiting for garbage collection. Similar to conventional Bartok and Singularity designs, before performing a collection, SafeOS waits for each thread in the system to block on a semaphore or at an allocation site. This ensures that the collector is able to scan the stack of every thread. This does raise the possibility that one thread in an infinite loop could starve the other threads of garbage collections. However, if this is a concern, Bartok can be modified to poll for collection requests at backwards branches, at a small run-time cost and with larger GC tables. Alternatively, if Bartok were able to generate GC information for all program counter values in the program, a precondition could be added to InterruptHandler saying that an interrupted stack is scannable, so that the kernel need not wait for threads to block before calling the garbage collector.

Figure 4:
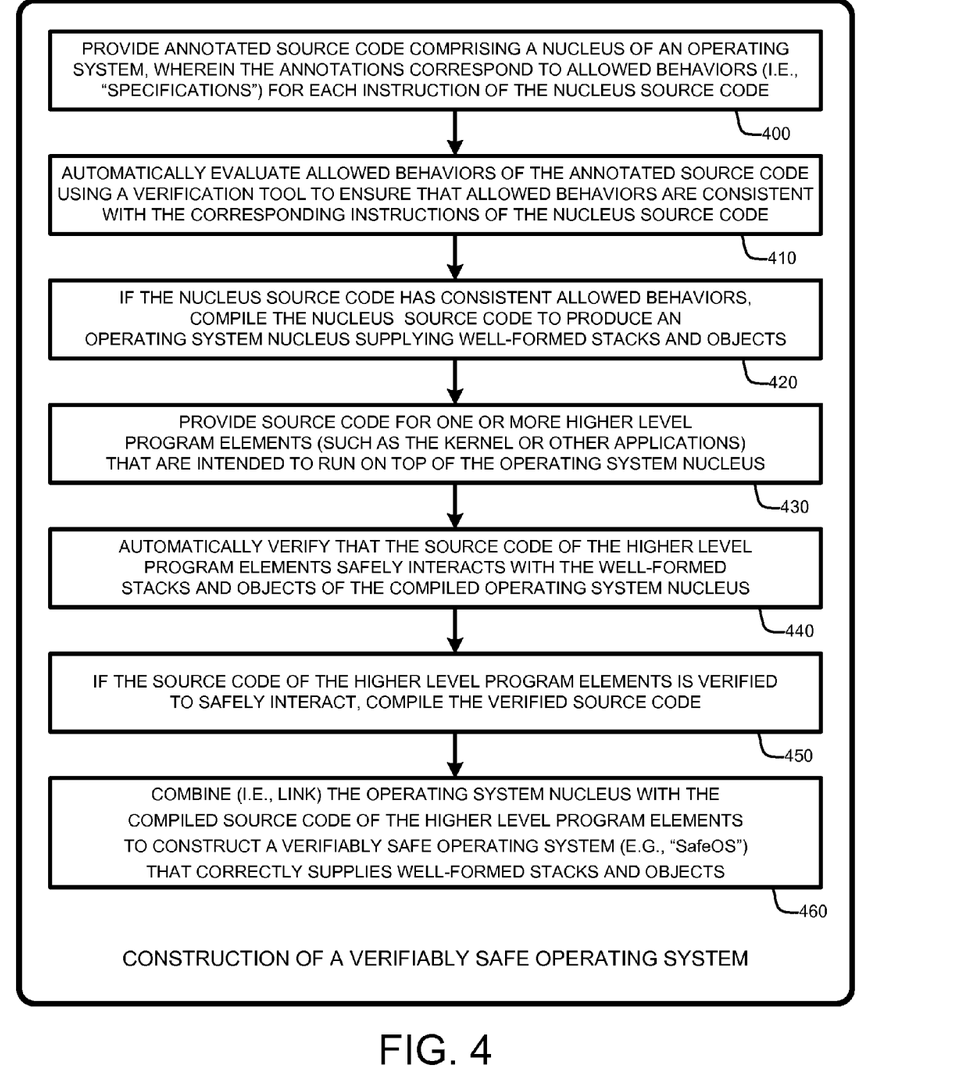
FIG. 4 illustrates a general system flow diagram that illustrates exemplary methods for implementing various embodiments of the "Automated, Static Safety Verifier", as described herein.

3.0 Summary of the "Automated, Static Safety Verifier":

The processes described above with respect to FIG. 1 through FIG. 3 and in further view of the detailed description provided above in Sections 1 and 2 are illustrated by the general operational flow diagram of FIG. 4. In particular, FIG. 4 provides an exemplary operational flow diagram that summarizes the operation of an exemplary embodiment of the "Automated, Static Safety Verifier". Note that FIG. 4 is not intended to be an exhaustive representation of all of the various embodiments of the "Automated, Static Safety Verifier" described herein, and that the embodiments represented in FIG. 4 are provided only for purposes of explanation.

In general, as illustrated by FIG. 4, the "Automated, Static Safety Verifier" begins operation by providing 400 annotated source code comprising a Nucleus of an operating system. In general as discussed in detail above, these annotations correspond to allowed behaviors (i.e., "specifications") for each instruction of the Nucleus source code.

Next, the "Automated, Static Safety Verifier" automatically evaluates 410 allowed behaviors of the annotated source code using a verification tool (e.g., Boogie, as discussed above) to ensure that allowed behaviors are consistent with the corresponding instructions of the Nucleus source code. Following this evaluation 410, if the nucleus source code is determined to have consistent allowed behaviors, the "Automated, Static Safety Verifier" compiles 420 the Nucleus source code to produce an operating system nucleus supplying well-formed stacks and objects.

Once the operating system Nucleus has been compiled 420, the "Automated, Static Safety Verifier" constructs the kernel and/or other higher level program elements. In particular, the next step is to provide 430 source code for one or more higher level program elements (such as the kernel or other applications) that are intended to run on top of the operating system nucleus. The "Automated, Static Safety Verifier" then automatically verifies 440 (e.g., using a tool such as the aforementioned TAL checker) that the source code of the higher level program elements safely interacts with the well-formed stacks and objects of the compiled operating system nucleus.

If the source code of the higher level program elements is verified to safely interact, then the "Automated, Static Safety Verifier" compiles 450 the verified source code. Finally, the "Automated, Static Safety Verifier" uses a conventional linker (trusted) to combine 460 (i.e., link) the compiled operating system nucleus with the compiled source code of the higher level program elements to construct a verifiably safe operating system (e.g., "SafeOS") that correctly supplies well-formed stacks and objects.

Figure 5:
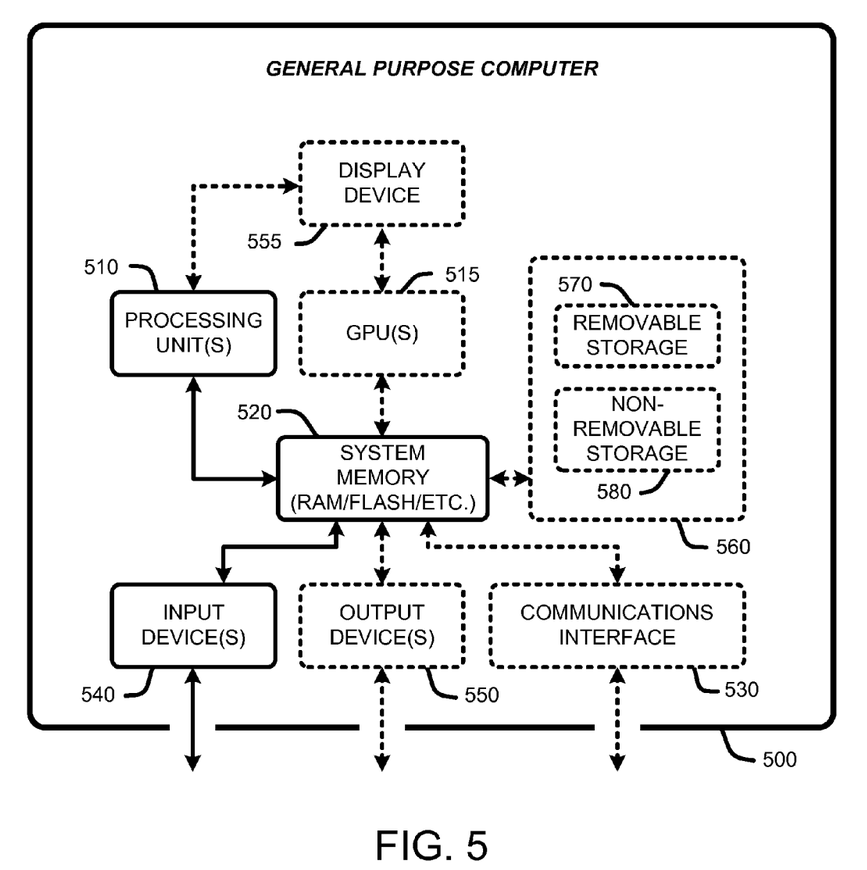
FIG. 5 is a general system diagram depicting a simplified general-purpose computing device having simplified computing and I/O capabilities for use in implementing various embodiments of the "Automated, Static Safety Verifier", as described herein.

4.0 Exemplary Operating Environments:

The "Automated, Static Safety Verifier" described herein is operational within numerous types of general purpose or special purpose computing system environments or configurations. FIG. 5 illustrates a simplified example of a general-purpose computer system on which various embodiments and elements of the "Automated, Static Safety Verifier", as described herein, may be implemented. It should be noted that any boxes that are represented by broken or dashed lines in FIG. 5 represent alternate embodiments of the simplified computing device, and that any or all of these alternate embodiments, as described below, may be used in combination with other alternate embodiments that are described throughout this document.

For example, FIG. 5 shows a general system diagram showing a simplified computing device. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, network PCs, minicomputers, mainframe computers, etc.

To allow a device to implement the "Automated, Static Safety Verifier", the device should have a sufficient computational capability to perform the various evaluation, verification, and compilation processes and techniques described herein. In particular, as illustrated by FIG. 5, the computational capability is generally illustrated by one or more processing unit(s) 510, and may include one or more GPUs 515. Note that that the processing unit(s) 510 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 5 may also include other components, such as, for example, a communications interface 530. The simplified computing device of FIG. 5 may also include one or more conventional computer input devices 540. The simplified computing device of FIG. 5 may also include other optional components, such as, for example one or more conventional computer output devices 550. Finally, the simplified computing device of FIG. 5 may also include storage 560 that is either removable 570 and/or non-removable 580. Note that typical communications interfaces 530, input devices 540, output devices 550, and storage devices 560 for general-purpose computers are well known to those skilled in the art, and will not be described in detail herein.

The foregoing description of the "Automated, Static Safety Verifier" has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the "Automated, Static Safety Verifier". It is intended that the scope of the invention be limited not by this detailed description, but rather by the claims appended hereto.

What is claimed is:

1. A method for verification of a safe operating system that correctly supplies "well-formed" stacks and objects, comprising steps for:
    providing annotated source code comprising a nucleus of an operating system, wherein the nucleus provides hardware and memory access for the operating system, and wherein the annotations correspond to allowed behaviors for each instruction of the source code of the nucleus;
    evaluating the allowed behaviors of the annotated source code using a verification tool to ensure that the allowed behaviors are consistent with the corresponding instructions;
    wherein source code having consistent allowed behaviors is compiled to produce an operating system nucleus supplying "well-formed" stacks and objects;
    providing source code for one or more higher level program elements intended to be run on top of the operating system nucleus;
    verifying that the source code of the higher level program elements safely interacts with the "well-formed" stacks and objects of the compiled operating system nucleus;
    compiling verified source code of the higher level program elements; and
    combining the operating system nucleus with the compiled source code of the higher level program elements to construct a verifiably safe operating system.

2. The method of claim 1 wherein the verification tool for ensuring that the allowed behaviors are consistent with the corresponding instructions further comprises a Hoare-style program verifier that verifies assembly language instructions comprising the annotated source code against the allowed behaviors.

3. The method of claim 1 wherein the source code of the higher level program elements is compiled to typed assembly language (TAL) prior to being verified, and wherein verifying that source code comprises evaluating that source code using a TAL checker to verify safe interaction with the "well-formed" stacks and objects of the compiled operating system nucleus.

4. The method of claim 3 wherein the TAL checker enforces a guarantee that whenever any assembly language code of the nucleus transfers control to higher-level code, the higher-level code's stack and heap are both "well-formed".

5. The method of claim 1 wherein stacks are "well-formed" when they consist of zero or more stack frames, where:
    each frame's memory does not overlap with the memory of any other stack frame or object; and
    each frame contains zero or more pointers, each pointing to some object, where, if the pointer has a specific type, then the pointed-to object has a type that is assignable to that specific type.

6. The method of claim 1 wherein objects are "well-formed" where:
    the object's memory does not overlap with the memory of any other stack frame or object; and
    the object contains zero or more pointers, each pointing to some object, where, if the pointer has a specific type, then the pointed-to object has a type that is assignable to that specific type.

7. The method of claim 1 wherein the verifiably safe operating system is further combined with an executable boot loader to construct a bootable verifiably safe operating system.

8. A system having a processor for generating a verifiably safe operating system, comprising:
    an automated verification tool for evaluating annotated source code comprising a nucleus of an operating system, wherein the nucleus provides hardware and memory access for the operating system, and wherein the annotations correspond to allowed behaviors for each instruction of the source code, to ensure that the allowed behaviors are consistent with the corresponding instructions;

a compiler for compiling source code having consistent allowed behaviors to produce a compiled operating system nucleus supplying "well-formed" stacks and objects;

a checker tool for verifying that source code of one or more higher level program elements intended to be run on top of the operating system nucleus safely interacts with the "well-formed" stacks and objects of the compiled operating system nucleus;

compiling verified source code of the higher level program elements; and linking the compiled operating system nucleus with the compiled source code of the higher level program elements to construct a verifiably safe operating system that correctly supplies "well-formed" stacks and objects.

9. The system of claim 8 wherein the verification tool further comprises a Hoare-style program verifier that verifies assembly language instructions comprising the annotated source code against the allowed behaviors.

10. The system of claim 8 wherein the source code of the higher level program elements is compiled to typed assembly language (TAL) prior to being verified, and wherein verifying that source code comprises evaluating that source code using a TAL checker to verify safe interaction with the "well-formed" stacks and objects of the compiled operating system nucleus.

11. The system of claim 10 wherein the TAL checker enforces a guarantee that whenever control is transferred to any higher-level code, the higher-level code's stack and heap are both "well-formed".

12. The system of claim 8 wherein stacks are "well-formed" when they consist of zero or more stack frames, where:
  each frame's memory does not overlap with the memory of any other stack frame or object; and
  each frame contains zero or more pointers, each pointing to some object, where, if the pointer has a specific type, then the pointed-to object has a type that is assignable to that specific type.

13. The system of claim 8 wherein objects are "well-formed" where:
  the object's memory does not overlap with the memory of any other stack frame or object; and
  the object contains zero or more pointers, each pointing to some object, where, if the pointer has a specific type, then the pointed-to object has a type that is assignable to that specific type.

14. The system of claim 8 wherein the operating system nucleus includes a plurality of functions, and wherein none of those functions ever blocks, such that each such function performs a finite amount of work then returns to a thread that is not required to be the same thread that invoked that function.

15. The system of claim 8 wherein the verifiably safe operating system is further combined with an executable boot loader to construct a bootable verifiably safe operating system.

16. A computer-readable memory having computer executable instructions stored therein for generating a verifiably safe operating system, said instructions comprising causing a computing device to:

receive a first set of source code, said first set of source code defining an operating system nucleus that provides hardware and memory access for the operating system;

compile the first set of source code to a first set of assembly language instructions;

annotate each instruction of the first set of assembly language instructions to define allowed behaviors for each of those assembly language instructions;

evaluate the allowed behaviors of the annotated source code using a Hoare-style program verification tool to ensure that the allowed behaviors are consistent with each corresponding assembly language instruction;

if each assembly language instruction in the first set of assembly language instructions are verified to be consistent with their corresponding allowed behaviors, use an assembler to compile the first set of assembly language instructions to produce an operating system nucleus object supplying "well-formed" stacks and "well-formed" objects;

receiving a second set of source code, said second set of source code defining a kernel;

compile the second set of source code to a set of typed assembly language (TAL) instructions;

use a TAL checker to verify safe interaction of the TAL instructions defining the kernel with the "well-formed" stacks and "well-formed" objects of the compiled operating system nucleus;

if the safe interaction of the TAL instructions is verified, compiling the verified TAL instructions to produce a kernel object; and use a linker to link the operating system nucleus object and the kernel object to construct a verifiably safe operating system that correctly supplies "well-formed" stacks and "well-formed" objects.

17. The computer-readable memory of claim 16 wherein stacks are "well-formed" when they consist of zero or more stack frames, where:
  each frame's memory does not overlap with the memory of any other stack frame or object; and
  each frame contains zero or more pointers, each pointing to some object, where, if the pointer has a specific type, then the pointed-to object has a type that is assignable to that specific type.

18. The computer-readable memory of claim 16 wherein objects are "well-formed" where:
  the object's memory does not overlap with the memory of any other stack frame or object; and
  the object contains zero or more pointers, each pointing to some object, where, if the pointer has a specific type, then the pointed-to object has a type that is assignable to that specific type.

19. The computer-readable memory of claim 16 wherein the verifiably safe operating system is further combined with an executable boot loader to construct a bootable verifiably safe operating system.

20. The computer-readable memory of claim 16 wherein the operating system nucleus includes a plurality of functions, and wherein none of those functions ever blocks, such that each such function performs a finite amount of work then returns to a thread that is not required to be the same thread that invoked that function.

* * * * *